United States Patent [19]

Widmer

[11] Patent Number: 5,693,277

[45] Date of Patent: Dec. 2, 1997

[54] METHOD FOR MAKING A NOVELTY CANDLE

[76] Inventor: Michael R. Widmer, P.O. Box 46542, Chicago, Ill. 60646

[21] Appl. No.: 492,953

[22] Filed: Jun. 21, 1995

[51] Int. Cl.$^6$ .............. B29C 31/00; B29C 37/00; B29C 39/12
[52] U.S. Cl. .............. 264/153; 264/40.6; 264/160; 264/247; 264/275; 264/277; 264/271.1; 425/DIG. 19; 425/DIG. 803
[58] Field of Search .................. 264/153, 157, 264/261, 271.1, 40.6, 160, 275, 247, 277; 425/DIG. 19, DIG. 803; 431/288, 126

[56] References Cited

U.S. PATENT DOCUMENTS

| | | | |
|---|---|---|---|
| 1,964,200 | 6/1934 | French | 87/21 |
| 2,122,451 | 7/1938 | Cassimatis | 18/58 |
| 2,817,225 | 12/1957 | Weglin . | |
| 2,841,972 | 7/1958 | Weglin . | |
| 3,072,970 | 1/1963 | Anderson | 18/58 |
| 3,294,888 | 12/1966 | Lindahl | 264/248 |
| 3,385,649 | 5/1968 | Hicks | 431/126 |
| 3,411,856 | 11/1968 | Crumrine, Jr. | 431/126 |
| 3,744,956 | 7/1973 | Hess | 431/126 |
| 3,759,478 | 9/1973 | Schmitt et al. | 249/93 |
| 3,867,173 | 2/1975 | Putzer . | |
| 3,983,677 | 10/1976 | Lundbom . | |
| 4,054,636 | 10/1977 | Menig . | |
| 4,225,552 | 9/1980 | Chang . | |
| 4,427,366 | 1/1984 | Moore | 431/291 |
| 4,614,625 | 9/1986 | Wilson | 264/6 |
| 4,826,428 | 5/1989 | Lam . | |
| 4,830,330 | 5/1989 | Cox et al. . | |

*Primary Examiner*—Jan H. Silbaugh
*Assistant Examiner*—Robin S. Gray
*Attorney, Agent, or Firm*—Hill, Steadman & Simpson

[57] ABSTRACT

A novelty candle having flat sides incorporating a plurality of defined shapes located at the outer surface of the flat sides of the candle and a method of making same are provided. The method has the steps of: forming a sheet of wax to a desired thickness; heating the sheet of wax to below the melting temperature of the wax; cutting a plurality of shapes from the heated sheet of wax; arranging the plurality of shapes in a mold having an interior defined by flat sidewalls flush against the flat sidewalls and filling the interior of the mold with wax. In another embodiment, a novelty candle having a tree-like wax ornamentation on the surface thereof and a method of making same are also provided. The method has the steps of: providing a candle having a base and at least one flat surface; heating a supply of wax and dye on a flat heating surface to a temperature above a melting point of the wax to form a combined supply; placing the at least one flat surface of the candle on the flat heating surface of the hot plate so that the at least one flat surface comes into contact with the combined supply; and removing the at least one flat surface of the candle from the combined supply.

3 Claims, 4 Drawing Sheets

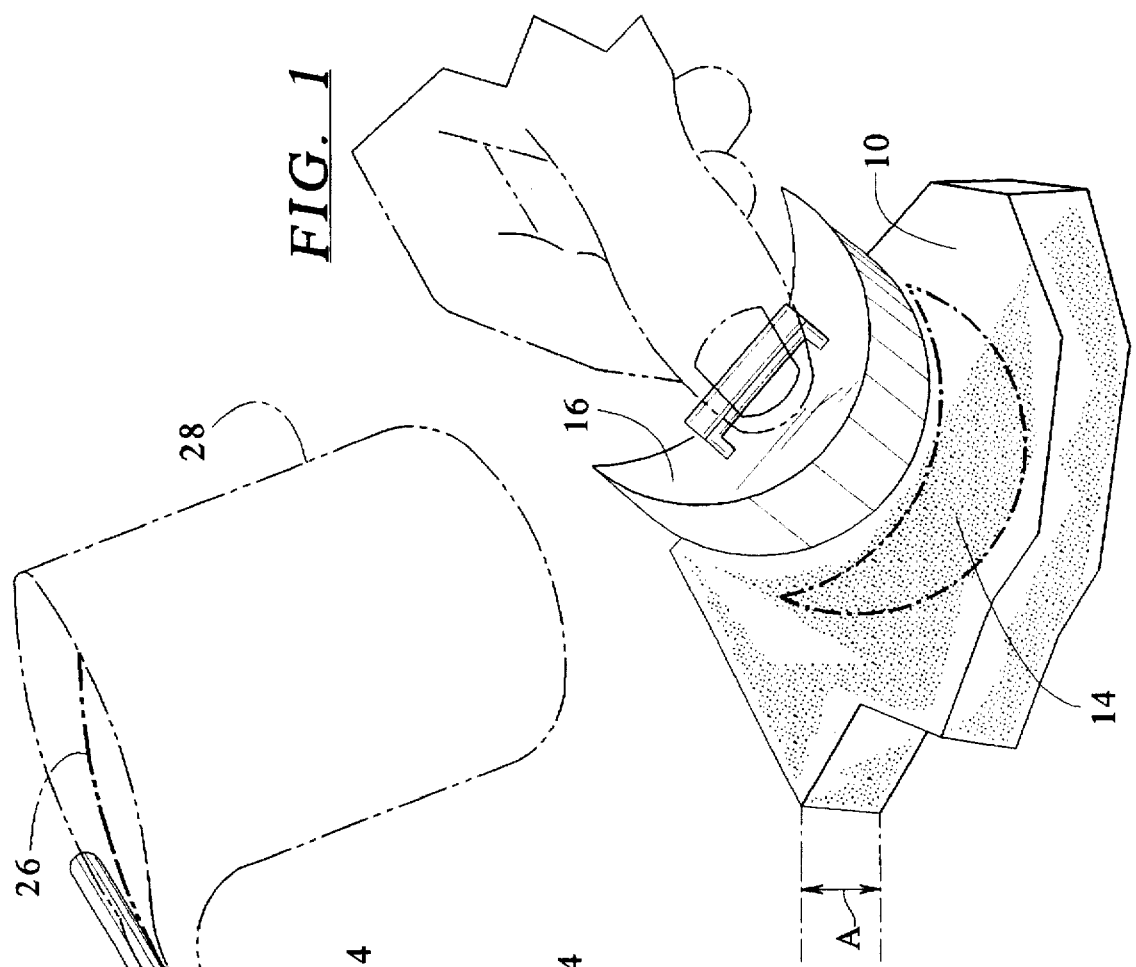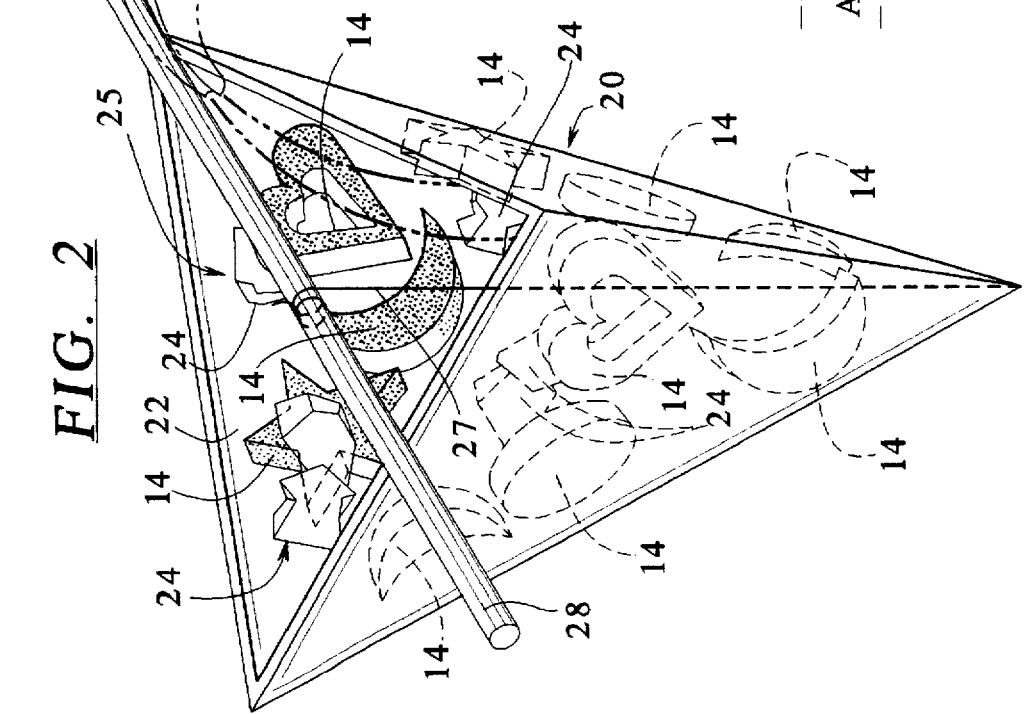

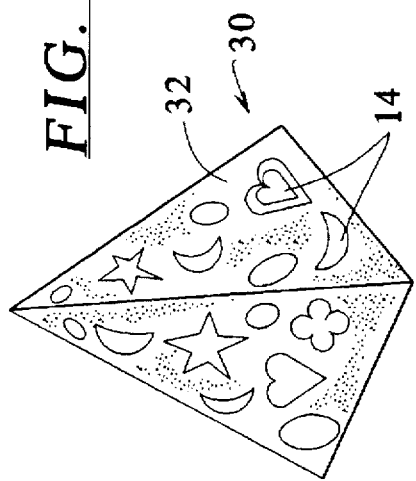
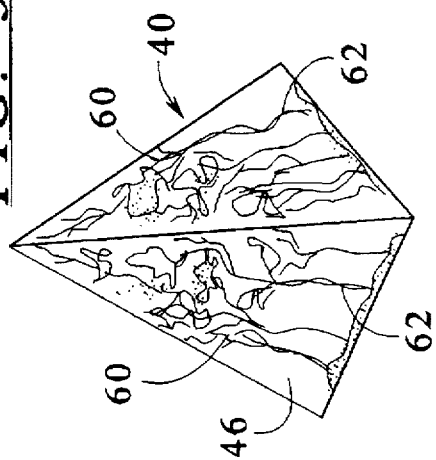
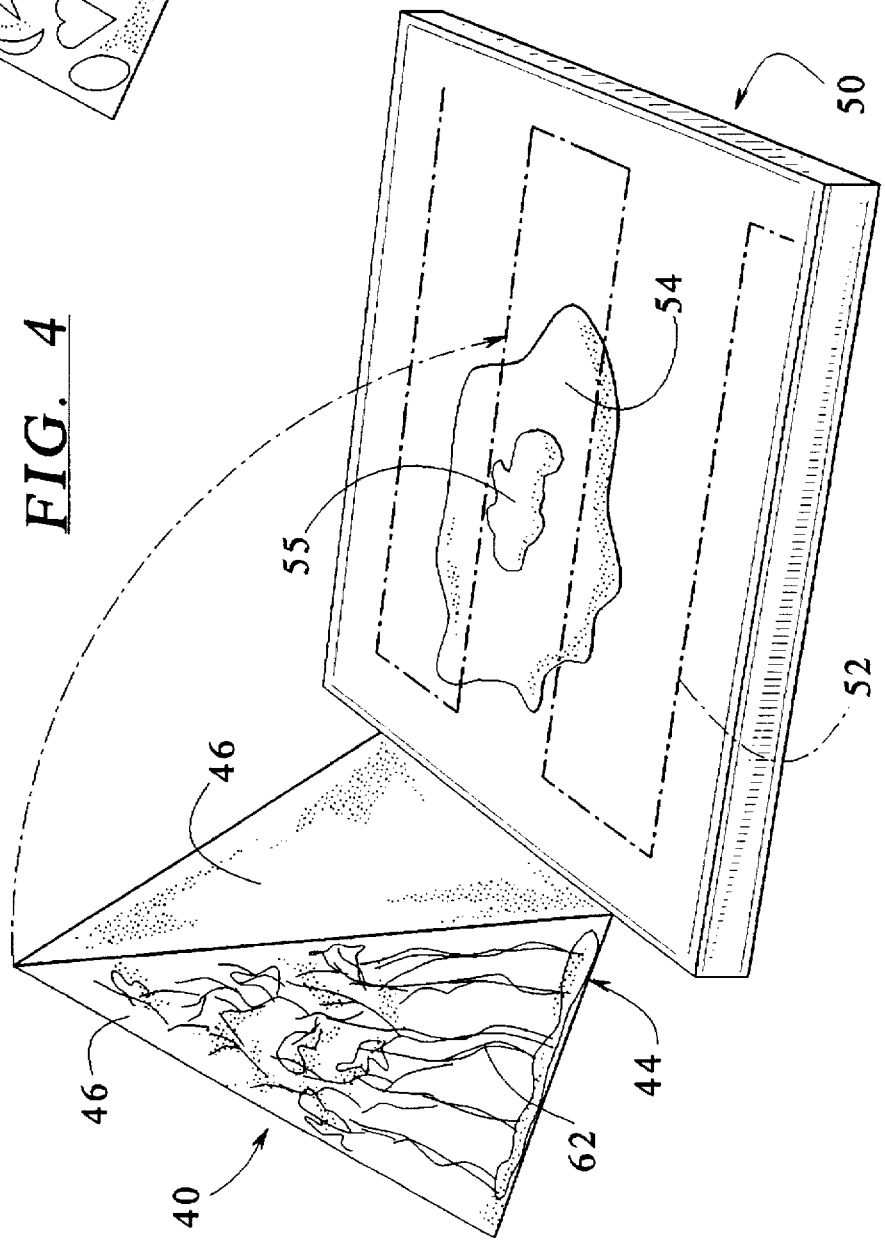

FIG. 7

PROVIDING A CANDLE HAVING A BASE AND AT LEAST ONE FLAT SURFACE AND A SUPPLY OF WAX AND DYE — 120

↓

HEATING A NON-STICK HOT PLATE HAVING A FLAT HEATING SURFACE TO A TEMPERATURE ABOVE (10-100° F) A MELTING POINT OF THE WAX — 124

↓

PLACING A DESIRED AMOUNT OF THE SUPPLY OF WAX AND DYE ON THE HEATED FLAT HEATING SURFACE — 128

↓

PLACING THE AT LEAST ONE FLAT SURFACE OF THE CANDLE ON THE FLAT HEATING SURFACE OF THE HOT PLATE SO THAT AT LEAST ONE FLAT SURFACE COMES INTO CONTACT WITH THE WAX AND DYE — 130

↓

LIFTING THE AT LEAST ONE FLAT SURFACE OF THE CANDLE OFF OF THE HOT PLATE — 134

↓

PLACING THE CANDLE ON THE BASE WHILE THE WAX AND DYE COOLS — 136

METHOD FOR MAKING A NOVELTY CANDLE

BACKGROUND OF THE INVENTION

The present invention relates generally to candles and more specifically to a novelty candle having incorporated defined shapes and a method of making same. An additional embodiment provides a novelty candle having a tree-like ornamentation on the surface thereof and a method of making the same.

Of course, candles have been generally available for centuries. Candles typically have both utility and ornamental appeal. For example, the warm glow of a candle can provide light, as well as being a decorative device for accessorizing a home. Many candles have been manufactured over the years including some which are very ornate. For example, U.S. Pat. No. 4,826,428 to Lam discloses a candle arrangement having a body made up of a plurality of individual pieces of wax. The plurality of wax pieces are shaped and stacked together to form a decorative candle body. However, the pieces often are difficult to see in full and to differentiate from the remainder of the candle or other pieces in the candle.

While many types of candles are produced today, a need has arisen for a novelty candle having incorporated defined shapes and a simple method of making same. Similarly, a need has arisen for a novelty candle having a tree-like wax ornamentation on the surface thereof.

SUMMARY OF THE INVENTION

The present invention provides a novelty candle and a method of making same. The candle has incorporated defined shapes on the surface thereof. Another embodiment of the present invention provides a novelty candle having a tree-like wax ornamentation on the surface thereof and a method of making same.

To this end, the present invention provides a method of making a novelty candle having incorporated defined shapes. The method comprises the steps of: forming a sheet of wax to a desired thickness; heating the sheet of wax to a temperature lower than a melting temperature of the wax; cutting a plurality of shapes from the heated sheet of wax; arranging the plurality of shapes in a mold having an interior defined by flat sidewalls flush against the flat sidewalls; and filling the interior of the mold with wax.

In an embodiment, the method of the present invention further provides the step of: placing a sheet of unwaxed paper under the sheet of wax prior to the step of heating the sheet of wax.

In an embodiment, the present invention further provides the step of: filling the mold with pieces of wax.

In an embodiment, the present invention further provides the step of: filling the interior of the mold with liquid wax.

In an embodiment, the present invention further provides the step of: arranging the plurality of shapes in abutting contact in the mold.

In an embodiment, the present invention further provides the step of: determining when the sheet of wax yields to touch prior to cutting the shapes from the heated sheet.

The present invention also provides a method of making a novelty candle having wax ornamentation on the exterior of the candle. The method comprises the steps of: providing a candle having a base and at least one flat surface; heating a supply of wax and a supply of dye on a flat heating surface to a temperature above a melting point of the supply of wax to form a combined supply; placing the at least one flat surface of the candle on the flat heating surface so that the at least one flat surface comes into contact with the combined supply; and removing the at least one flat surface of the candle from the combined supply.

In an embodiment, the present invention further provides the step of: heating the flat heating surface to a temperature in a range of 10°–100° F. above the melting point of the wax.

In an embodiment, the present invention further provides the step of: rubbing the supply of wax in the supply of dye to form liquified dyed wax.

In an embodiment, the present invention further provides the step of: heating the wax and dye to a relatively higher temperature above the melting point.

In an embodiment, the present invention further provides the step of: heating the wax and dye to a relatively lower temperature above the melting point.

In an embodiment, the present invention further provides the step of: providing a hot plate having a flat heating surface for melting the supply of wax.

The present invention also provides a candle in another embodiment. The candle comprises: a wax body having at least one flat surface defining a plane and a base; and a plurality of defined wax shapes incorporated into the at least one flat surface such that the at least one flat surface remains planar.

In an embodiment, the wax body is a tetrahedron.

In an embodiment, the plurality of defined wax shapes are formed of colored wax.

In another embodiment, the present invention provides a candle comprising: a preformed wax body having at least one flat surface; and a tree-shaped wax formation formed on the at least one flat surface.

In an embodiment, the preformed wax body is a tetrahedron.

In a further embodiment, the present invention further provides a candle comprising: a preformed wax body having at least one flat surface; and a fan-shaped wax formation formed on the at least one flat surface.

In an embodiment, the fan-shaped wax formation is formed of a mixture of a wax and a dye.

In an embodiment, the fan-shaped wax formation has a color different than that of the preformed wax body.

It is an advantage of the present invention to provide a novelty candle having incorporated defined shapes arranged in a flush manner at the surface of the candle.

Another advantage of the present invention is to provide a novelty candle having a tree-like wax ornamentation on the surface thereof.

A further advantage of the present invention is to provide a novelty candle having a fan-like wax ornamentation on the surface thereof.

Yet another advantage of the present invention is to provide a method of making a novelty candle having incorporated defined shapes in a simple manner.

A further advantage of the present invention is to provide a method of making a novelty candle having incorporated defined shapes wherein each manufactured candle is unique.

Still another advantage of the present invention is to provide a method of making a novelty candle having a tree-like wax ornamentation on the surface thereof.

Still another advantage of the present invention is to provide a method of making a novelty candle having a

3 wax-like ornamentation on the surface thereof wherein the ornamentation is unique.

BRIEF DESCRIPTION OF THE DRAWINGS

FIG. 1 illustrates a perspective view showing a step of cutting a shape from a source of wax produced in accordance with the method of the present invention.

FIG. 2 illustrates a perspective view of further steps of an embodiment of the method of the present invention.

FIG. 3 illustrates a perspective view of an embodiment of a candle manufactured in accordance with an embodiment of the method of the present invention.

FIG. 4 illustrates a perspective view showing a step involved in manufacturing a candle in accordance with an embodiment of the method of the present invention.

FIG. 5 illustrates a perspective view of an embodiment of a candle manufactured in accordance with an embodiment of the method of the present invention.

FIG. 7 illustrates a flowchart of the steps in another embodiment of the method of the present invention.

DETAILED DESCRIPTION OF THE PRESENTLY PREFERRED EMBODIMENTS

Figure 6:
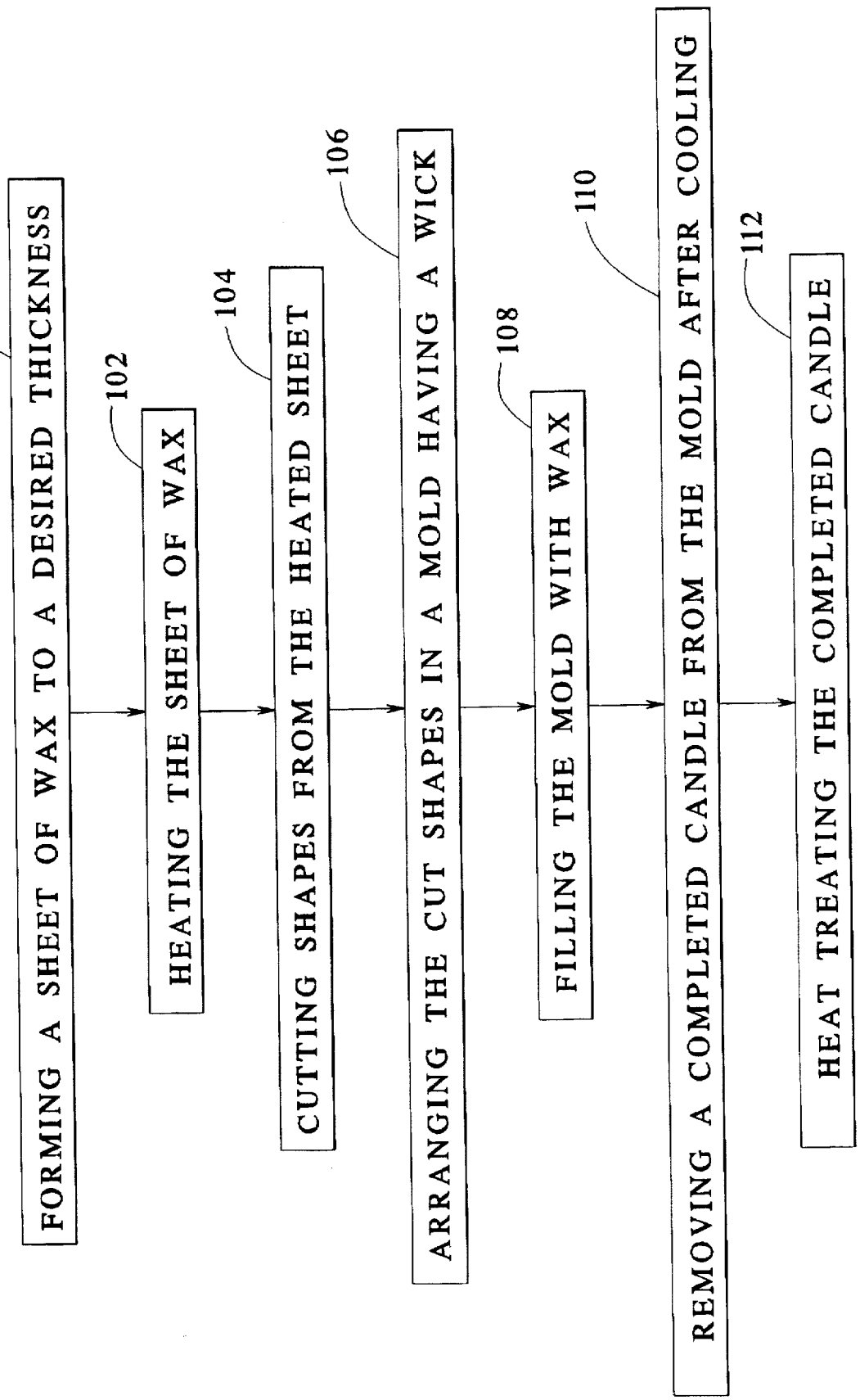
FIG. 6 illustrates a flowchart of the steps in an embodiment of the method of the present invention.

The present invention provides, in an embodiment, a candle having flat sides incorporating a plurality of defined shapes located at the outer surface of the flat sides of the candle and a method of making the same. In another embodiment, a candle is provided having a somewhat random wax ornamentation formed on the outer surface of the flat sides of the candle and a method of making the same. The present invention will now be described with reference to the figures.

An embodiment of the method of the present invention begins with forming a sheet of wax. The sheet is preferably composed of colored wax, and several sheets may be created, each sheet having a different color. To form the sheets, a liquid wax is preferably poured into a cookie sheet-like pan to a desired thickness. For example, the first step is performed by pouring a supply of colored, molten wax into a sheet-like form, i.e. a sheet pan. The wax is allowed to cool to room temperature, hardening in the process. The hardened sheet of wax is then removed from the pan. The sheet of wax formed to the desired thickness is set aside until further use of that color of wax is desired. When shapes of a certain color wax are desired, an oversized sheet (larger than the pan) of unwaxed paper is placed into the pan. The sheet of colored wax is also placed back into the pan on top of the oversized sheet of unwaxed paper.

In a subsequent step of an embodiment of the method of the present invention, the wax sheet is heated in an oven, for example, to a temperature near the melting temperature of the wax. Once the sheet of wax gives to the touch, which takes approximately 15–25 minutes depending on various factors (i.e., ambient temperature, heating speed of the oven, etc.), the pan of heated wax is removed from the oven. The semi-hard wax is then cut into the defined shapes as desired using a cookie cutter or like device.

As just described, FIG. 1 illustrates an embodiment of a sheet 10 of colored wax having a desired thickness "x" manufactured in accordance with the above method steps. FIG. 1 shows an embodiment of a crescent moon shape 14 being cut by a cutter 16 from the sheet 10 of softened wax. The desired number and types of shapes are cut from the

4 desired colors of sheets 10 of wax and are allowed to cool. Virtually any shape can be produced using the method of the present invention. Of course, one skilled in the art will appreciate that custom shapes may be cut from the sheets 10 of wax in a number of known methods.

After the defined wax shapes 14 have cooled, the shapes 14 are arranged in a mold 20 as illustrated in FIG. 2. In a preferred embodiment, the mold 20 is tetrahedron-shaped and has flat interior sidewalls 22, so that the shapes are capable of standing along the interior sidewalls 22 of the mold 20. In an embodiment, the mold 20 is then filled with wax pieces 24 of the sheet 10 that are left over from the cutting step. The wax pieces 24 partially fill an interior 25 of the mold 20 and hold the defined wax shapes 14 in place against the interior sidewalls 22 of the mold 20.

Preferably, the wax pieces 24 primarily remain in the center of this interior 25, away from the interior sidewalls 22 so that primarily only the shapes 14 are adjacent to the interior sidewalls 22. Then, as illustrated in FIG. 2, a supply of liquid wax 26 is poured from a vessel 28 into the interior 25 of the mold 20 to fill the voids of the mold 20. A candle 30 is then cast into the shape of the mold 20.

Also illustrated in FIG. 2 is a wick 27 and a wick holder 28. The wick holder 28 is arranged so that the wick 27 is preferably centered in the interior 25 of the mold 20. After the liquid wax 26 has cooled, the candle 30 may be removed from the mold 20.

The resulting candle 30 is shown in FIG. 3 and has incorporated defined shapes 14 such as moons, stars, etc., located flush along a flat exterior surface 32 of the candle 30. As mentioned above, the defined shapes 14 can include a multitude of shapes including, but not limited to: a house, a dollar sign, an egg, a mushroom, a heart having a cut-out heart, a guitar, a fish, a star, etc.

In another embodiment of the present invention, a method of forming a novelty candle is provided. The method involves the steps of casting a candle 40 in a mold. The candle 40 has a base 44 and at least one flat surface 46. The next step of the method is providing a hot plate 50 or other like heating mechanism having a flat heating surface 52 capable of heating wax to a desired temperature above the melting point of the wax. A supply of wax 54 and dye 55 is placed on the flat heating surface 52 of the hot plate 50. Preferably, a powdered dye is mixed with the molten wax. Alternatively, a supply of colored wax can be used. The hot plate 50 is heated to a temperature above the melting temperature of the wax 54. Preferably, the temperature is 10°–100° F. above the melting temperature of the wax 54. For example, 120° F. wax requires heating to approximately 125°–130°C. to liquify.

The base 44 of the pre-formed candle 40 is placed on the flat heating surface 52 of the hot plate 50 and quickly pressed into the now liquified mixture of wax 54 and dye 55. The candle 40 is pressed into the liquid mixture of wax 54 and dye 55. After a short period of time, ranging from approximately one-half of a second to two seconds, the candle 40 is removed from the heating surface 52. Doing so results in a tree-like or streaked formation 56 of wax 54 and dye 55 that is dried or solidified on the flat surface 46 of the candle 40.

Such a candle 40 manufactured by this embodiment of the method of the present invention is illustrated in FIG. 5. As shown, tree-like wax formations 56 having branches 60 running into a main trunk 62 are illustrated. A slightly different formation having the shape of an alluvial fan (not shown) is possible using the method of the present invention. To this end, for example, the step of heating the wax 54 and dye 55 is performed so that the temperature of the wax 54 and dye 55 is up to approximately 100° F. above the melting point of the wax 54. Then, the same method steps are performed. However, a more narrow-streaked, solidified formation of wax 54 and dye 55 forms on the flat surface 44 of the candle 40. Also, removing the candle 40 from the heating surface 52 more quickly results in thinner streaks of wax 54 and dye 55.

FIG. 6 illustrates a flowchart summarizing the steps of the first embodiment of the method of present invention described above. For example, in this embodiment of the method of the present invention, a step of forming a sheet of wax 10 using a sheet pan is defined generally at 100. In step 102, the sheet 10 of wax heated to a temperature below the melting point of wax. Next in step 104, the method of the present invention provides for cutting shapes from the heated sheet 10 of wax. Step 106 includes arranging the cut shapes in the mold 20 with the wick 27. In addition, step 108 provides filling the mold 20 with wax 26. This step can be additionally performed by filling the mold with left over wax pieces 24 that remain after cutting the shapes 14 in step 104. Finally, step 110 provides for removing a completed candle 30 from the mold 20 after cooling of the wax has occurred. The resulting candle 30 has incorporated defined shapes 14 located flush along the flat surfaces of the candle 30, so that the shapes 14 are easily visible yet do not alter the smoothness of the flat surface. To further enhance the smoothness of the flat surface of the candle, step 112 provides applying a heat treatment to the flat surface of the candle 30. Preferably, a propane torch is used to brush over the flat surfaces. Doing so provides a smoother, glossy finish to the candle 30.

FIG. 7 provides a flowchart summarizing another embodiment of a method of the present invention. With additional reference to FIG. 4, the method of FIG. 7 includes in step 120 providing the candle 40 with the base 44 and at least one flat surface 46 and the supply of wax 54 and dye 55. In step 124, the method provides heating the non-stick hot plate 50 having the flat heating surface 52 to a temperature above the melting point of the wax 54. Preferably, this temperature is in a range from 10°–100° F. above the melting temperature of the wax 54. Next, the desired amount of supply of wax 54 and dye 55 is placed on the flat heating surface 52 of the non-stick hot plate 50 in step 128. Step 130 provides placing the at least one flat surface 46 of the candle 40 on the flat heating surface 52 of the hot plate 50 so that the at least one flat surface 46 comes into contact with the wax 54 and dye 55. Further, the at least one flat surface 46 of the candle 40 is removed from the hot plate 50 in step 134. Finally, the candle 40 is placed on its base 44 while the wax 54 and dye 55 cools in step 136 to form the tree-like formation 56 of wax 54 and dye 55 on the flat surface 46 of the candle 40. The heat treatment step 112 of the prior embodiment is also possible in this embodiment.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A method of making a novelty candle having incorporated therein a plurality of different defined shapes, the method comprising the steps of:

forming a sheet of wax to a desired thickness;

heating said sheet of wax to a temperature lower than a melting temperature of said sheet of wax to provide a heated sheet of wax;

cutting a plurality of different defined shapes from said heated sheet of wax;

providing a mold having an interior defined by flat sidewalls;

arranging several of said plurality of different defined shapes in said mold to stand alongside and flush with said flat sidewalls of said mold;

partially filling said interior of said mold with additional wax pieces such that said additional wax pieces partially fill said interior of said mold and hold said different defined shapes, which stand alongside and flush with said flat sidewalls of said mold, in place against said flat sidewalls of said mold, said additional wax pieces remaining primarily in a center of said interior of said mold away from said flat sidewalls of said mold so that primarily only said plurality of different defined shapes which stand alongside and are flush with said flat sidewalls of said mold are adjacent said flat sidewalls of said mold; and then filling voids in said interior of said mold with liquid wax to form said novelty candle having a plurality of said different defined shapes located flush along a flat exterior surface thereof.

2. The method of claim 1 further comprising the step of:

placing a sheet of unwaxed paper under the sheet of wax prior to the step of heating the sheet of wax.

3. The method of claim 1 wherein said step of cutting comprises cutting said plurality of different defined shapes from said heated sheet of wax when said heated sheet of wax yields to touch.

* * * * *